(12) United States Patent
Yasuda et al.

(10) Patent No.: US 11,515,547 B2
(45) Date of Patent: Nov. 29, 2022

(54) FUEL CELL SEPARATOR PRECURSOR, AND FUEL CELL SEPARATOR

(71) Applicant: Nisshinbo Holdings Inc., Tokyo (JP)

(72) Inventors: Kosuke Yasuda, Chiba (JP); Takehiro Okei, Chiba (JP); Shoya Ashizaki, Chiba (JP)

(73) Assignee: NISSHINBO HOLDINGS INC., Tokyo (JP)

(*) Notice: Subject to any disclaimer, the term of this patent is extended or adjusted under 35 U.S.C. 154(b) by 368 days.

(21) Appl. No.: 16/638,368

(22) PCT Filed: Jul. 31, 2018

(86) PCT No.: PCT/JP2018/028630
§ 371 (c)(1),
(2) Date: Feb. 11, 2020

(87) PCT Pub. No.: WO2019/039214
PCT Pub. Date: Feb. 28, 2019

(65) Prior Publication Data
US 2020/0365914 A1 Nov. 19, 2020

(30) Foreign Application Priority Data
Aug. 24, 2017 (JP) .............................. JP2017-161007

(51) Int. Cl.
*H01M 4/02* (2006.01)
*H01M 8/0239* (2016.01)
*C08K 3/04* (2006.01)
*C08L 101/12* (2006.01)

(52) U.S. Cl.
CPC ............. *H01M 8/0239* (2013.01); *C08K 3/04* (2013.01); *C08L 101/12* (2013.01); *C08K 2201/001* (2013.01)

(58) Field of Classification Search
CPC ........................................................ H01M 8/08
See application file for complete search history.

(56) References Cited

U.S. PATENT DOCUMENTS

2010/0015497 A1* 1/2010 Hamada ............... H01M 8/0223
429/437

FOREIGN PATENT DOCUMENTS

| EP | 2034545 A1 | | 3/2009 |
|---|---|---|---|
| JP | 60-59671 A | | 4/1985 |
| JP | 2000-164226 A | | 6/2000 |
| JP | 2006-127812 | * | 5/2006 |
| JP | 2006-127812 A | | 5/2006 |
| JP | 2007-157387 A | | 6/2007 |
| JP | 2007-188696 A | | 7/2007 |
| JP | 2009-93965 A | | 4/2009 |

(Continued)

OTHER PUBLICATIONS

International Search Report dated Sep. 11, 2018, issued in counterpart International Application No. PCT/JP2018/028630 (2 pages).

(Continued)

*Primary Examiner* — Jacob B Marks
(74) *Attorney, Agent, or Firm* — WHDA, LLP

(57) ABSTRACT

Provided is a fuel cell separator precursor that is obtained by impregnating a porous sheet, which contains a conductive filler, with a resin composition that contains a thermoplastic resin and a conductive filler.

15 Claims, 1 Drawing Sheet

(56) References Cited

FOREIGN PATENT DOCUMENTS

JP          2011-222329        * 11/2011
JP          2011-222329  A      11/2011

OTHER PUBLICATIONS

Extended (Supplementary) European Search Report dated May 11, 2021, issued in counterpart EP Application No. 18848624.5. (7 pages).

* cited by examiner

FUEL CELL SEPARATOR PRECURSOR, AND FUEL CELL SEPARATOR

TECHNICAL FIELD

This invention relates to a fuel cell separator precursor and a fuel cell separator.

BACKGROUND ART

Fuel cell separator plays a role of imparting electroconductivity to the individual unit cells, a role of reserving a passage for a fuel and air (oxygen) to be fed to the unit cells, and a role as a separation boundary wall between the unit cells. The separator is thus required to have various characteristics such as high electroconductivity, high gas impermeability, chemical stability, heat resistance, and hydrophilicity.

An exemplary method for manufacturing a fuel cell separator is such as granulating an electroconductive filler and a binder resin, and then filling the thus prepared compound into dies for compressive molding. The method has, however, suffered from a problem that the granulating process and transfer process before molding are time-consuming, and that the obtainable separator will have poor strength and therefore fragile (thinning not possible) due to large content of the electroconductive filler for achieving electroconductivity.

As a solution to this problem, there has been proposed a technique of mixing a resin into an electroconductive sheet. However, such method has also suffered from a problem that the electroconductive sheet needs voids into which the resin can be impregnated, causing non-uniform distribution of the electroconductive component. Also, addition of a non-electroconductive component such as fibrous matter, aiming at strengthening the electroconductive sheet, has degraded the electroconductivity.

PRIOR ART DOCUMENTS

Patent Documents

Patent Document 1: JP-A S60-59671

SUMMARY OF INVENTION

Technical Problem

An object of the invention, which has been made under the above circumstances, is to provide a fuel cell separator precursor that is strong enough to be conveyable in a sheet form, excels in the electroconductivity after being molded, and has reduced dispersion of electroconductivity; and a fuel cell separator obtainable by using the same.

Solution to Problem

Making extensive investigations to attain the above object, the inventors have found that the aforementioned problems may be solved by impregnating a resin composition that contains a thermoplastic resin and an electroconductive filler, into a porous sheet containing an electroconductive filler, and have reached this invention.

That is, this invention provides a fuel cell separator precursor and a fuel cell separator as follows.

1. A fuel cell separator precursor including a porous sheet containing an electroconductive filler, a resin composition containing a thermoplastic resin and an electroconductive filler being impregnated in the porous sheet.
2. The fuel cell separator precursor according to 1, wherein the thermoplastic resin has a melting point or a glass transition point of 100° C. or higher.
3. The fuel cell separator precursor according to 1 or 2, wherein the electroconductive filler contained in the resin composition includes a carbon material.
4. The fuel cell separator precursor according to any one of 1 to 3, wherein the porous sheet containing an electroconductive filler includes a paper sheet containing an electroconductive filler and an organic fiber, a carbon fiber sheet, or a carbon fiber-reinforced carbon composite material.
5. A fuel cell separator obtained from the fuel cell separator precursor according to any one of 1 to 4.
6. A method for manufacturing a fuel cell separator precursor, the method including impregnating a resin composition containing a thermoplastic resin and an electroconductive filler, into a porous sheet containing an electroconductive filler.
7. The method for manufacturing a fuel cell separator precursor according to 6, wherein the resin composition has a film form.
8. The method for manufacturing a fuel cell separator precursor according to 7, wherein the resin composition has a liquid form.
9. A method for manufacturing a fuel cell separator, the method including heating and molding the fuel cell separator precursor according to any one of 1 to 4.
10. A resin composition for fuel cell separator including a thermoplastic resin and an electroconductive filler.

Advantageous Effects of Invention

The fuel cell separator precursor of this invention that excels in strength now can be wound into a roll, and can be continuously fed through, equipment while being unwound from the roll, which have not been accessible by the prior methods. Moreover, the precursor wound into the roll is advantageously easy to be transferred to subsequent processes or to be stored temporarily. The fuel cell separator precursor of this invention, containing a fibrous matter, can be formed into a thin fuel cell separator, making it possible to improve not only mechanical properties including flexural elasticity, but also brittle fracture resistance and damage tolerance.

The fuel cell separator precursor of this invention, having the resin composition that contains the electroconductive filler impregnated therein, can eliminate dispersion of electroconductivity, due to uneven distribution or flocculation of the electroconductive component in the porous sheet. Since impregnation of the resin composition into the porous sheet is followed by formation of an electroconductive filler layer over such sheet, so that the resistivity may be suppressed from being lowered, and also surface conductivity may be improved. Since the porous sheet will have a reduced content of the electroconductive component used for manufacturing the precursor, so that the sheet per se will have well suppressed dispersion of the electroconductive component.

DESCRIPTION OF EMBODIMENTS

[Fuel Cell Separator Precursor]

Figure 1:
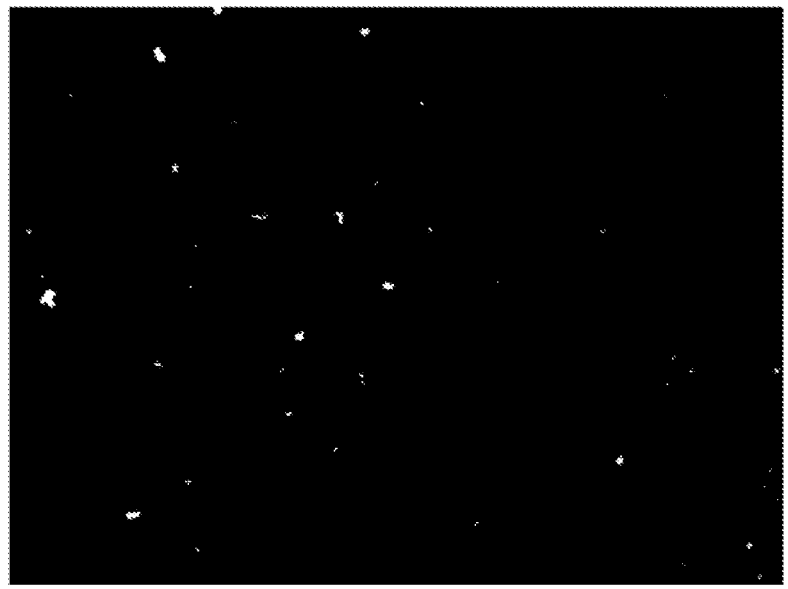
FIG. 1 is a metallograph of fuel cell separator precursor A obtained in Example 1.

A fuel cell separator precursor of this invention has a porous sheet containing an electroconductive filler, into which a resin composition containing a thermoplastic resin and an electroconductive filler is impregnated.

[Porous Sheet Containing Electroconductive Filler]

The porous sheet containing an electroconductive filler, used in the fuel cell separator precursor of the invention, is preferably, but is not specifically limited to, those composed of a paper sheet containing an electroconductive filler and an organic fiber, a carbon fiber sheet, or a carbon fiber-reinforced carbon composite material.

[Paper Sheet]

The paper sheet contains an electroconductive filler and an organic fiber. The electroconductive filler is not specifically limited, and any known materials having been used for the fuel cell separator are employable. The electroconductive filler is exemplified by carbon material; metal powder; and inorganic or organic powder on which metal is deposited by evaporation or plating. Carbon material is preferable. The carbon material is exemplified by graphites such as natural graphite, synthetic graphite obtained by baking needle coke, synthetic graphite obtained by baking lump coke, and expandable graphite obtained by chemical treatment of natural graphite; crushed carbon electrode; coal pitch; petroleum pitch; coke; activated carbon; glassy carbon; acetylene black, and Ketjen black. Among them, the graphites are preferable as the electroconductive filler from the viewpoint of electroconductivity. The synthetic graphites are more preferable. Only a single kind of the electroconductive filler may be used independently, or two or more kinds may be used in a combined manner.

The electroconductive filler may have any shape selectable without special limitation from sphere, scale, lump, foil, plate, needle and irregular shape. From the viewpoint of gas barrier performance of the separator, a scaly shape is preferable. In particular, in this invention, the scaly graphite is preferably used as the electroconductive filler.

The electroconductive filler preferably has an average particle size of 5 to 200 µm, which is more preferably 20 to 80 µm. With the average particle size of the electroconductive filler controlled within the aforementioned ranges, a necessary level of electroconductivity is obtainable while retaining gas barrier performance. The average particle size in the context of this invention means median diameter ($d_{50}$) measured by particle size distribution analysis based on laser diffractometry.

The content of the electroconductive filler in the paper sheet is preferably 50 to 96% by weight, and more preferably 50 to 85% by weight. With the content of the electroconductive filler controlled within the aforementioned ranges, a necessary level of electroconductivity is obtainable without damaging the moldability.

The organic fiber preferably has a melting point higher than a heating temperature employed when the fuel cell separator precursor of this invention is molded into the fuel cell separator, By using such organic fiber (also referred to as a "first organic fiber", hereinafier), it now becomes possible to improve strength of the fuel cell separator precursor and the fuel cell separator obtainable therefrom.

Materials for composing the organic fiber are exemplified by aramids such as poly(p-phenylene terephthalamide) (decomposition temperature=500° C.) and poly(m-phenylene isophthalamide) (decomposition temperature=500° C.); cellulose (melting point=260° C.); acetate (melting point=260° C.); nylon-polyester (melting point=260° C.); and polyphenylene sulfide (PPS) (melting point=280° C.).

The organic fiber may further contain a second organic fiber having a melting point lower than a heating temperature employed when the fuel cell separator precursor of this invention is molded into the fuel cell separator. The second organic fiber preferably has affinity to a resin contained in the resin composition for fuel cell separator described later. Materials for composing the second organic fiber is preferably polyethylene (PE) (melting point=120 to 140° C. (HDPE) 95 to 130° C. (LDPE), polypropylene (PP) (melting point=160° C.), and polyphenylene sulfide.

When the second organic fiber is contained, the first organic fiber preferably has a melting point 10° C. or more higher than the aforementioned heating temperature, from the viewpoint of reliably retaining the fiber shape necessary for imparting impact resistance, which is more preferably higher by 20° C. or more, and even more preferably higher by 30° C. or more. The second organic fiber preferably has a melting point 10° C. or more lower than the aforementioned heating temperature, from the viewpoint of moldability, which is more preferably lower by 20° C. or more, and even more preferably lower by 30° C. or more. Difference between the melting points of the first and second organic fibers is preferably 40° C. or larger, and more preferably 60° C. or larger.

The organic fiber preferably has an average fiber length of 0.1 to 10 mm, from the viewpoint of stabilizing grammage during paper making, and of keeping strength of the obtainable paper sheet, which is more preferably 0.1 to 6 mm, and even more preferably 0.5 to 6 mm. The first and second organic fibers preferably have an average fiber diameter of 0.1 to 100 µm from the viewpoint of moldability, which is more preferably 0.1 to 50 µm, and even more preferably 1 to 50 µm. Note that the average fiber length and average fiber diameter in this invention are arithmetic average values of fiber length and fiber diameter of 100 fibers measured under an optical microscope or electron microscope.

When the second organic fiber is contained, the first organic fiber is preferably aramid, cellulose, acetate or nylon-polyester, meanwhile the second organic fiber is preferably PE, PP or PPS. Note that, in a case where PE or PP is used as the second organic fiber, it is acceptable to use, as the first organic fiber, aramid, cellulose, acetate or nylon-polyester, which may even be PPS as well.

The content of the organic fiber in the precursor of this invention is preferably 1 to 20% by weight, and more preferably 3 to 15% by weight. With the content of the organic fiber controlled within the aforementioned ranges, damage tolerance after molding may be imparted without degrading the moldability. Only a single kind of the organic fiber may be used independently, or two or more kinds may be used in a combined manner.

The content of the second organic fiber, when contained, is preferably 10 to 80% by weight and more preferably 50 to 80% by weight. With the content of the second organic fiber controlled within the aforementioned ranges, moldability may be imparted without degrading electroconductivity of the molded article. Only a single kind of the second organic fiber may be used independently, or two or more kinds may be used in a combined manner.

The paper sheet may further contain a conduction auxiliary, aiming at reducing resistivity of the fuel cell separator obtainable therefrom. The conduction auxiliary is exemplified by carbon fiber, carbon nanofiber, carbon nanotube, various metal fibers, and inorganic and organic fibers on which metal is deposited or plated. Among them, preferable are fibrous carbon materials such as carbon fiber, carbon nanofiber and carbon nanotube, from the viewpoint of corrosion resistance.

The carbon fiber is exemplified by polyacrylonitrile (PAN)-based carbon fiber derived from PAN fiber, pitch-based carbon fiber derived from pitches such as petroleum pitch, and phenol-based carbon fiber derived from phenolic resin. PAN-based carbon fiber is preferable from the viewpoint of cost.

The fibrous conduction auxiliary preferably has an average fiber length of 0.1 to 10 mm, from the viewpoint of balancing moldability and electroconductivity, which is more preferably 0.1 to 7 mm, and even more preferably 0.1 to 5 mm. The average fiber diameter is preferably 3 to 50 μm from the viewpoint of moldability, which is more preferably 3 to 30 μm and even more preferably 3 to 15 μm.

The content of the conduction auxiliary in the paper sheet is preferably 1 to 20% by weight, and more preferably 3 to 10% by weight. With the content of the conduction auxiliary controlled within the aforementioned ranges, a necessary level of electroconductivity is obtainable without damaging the moldability. Only a single kind of the conduction auxiliary may be used independently, or two or more kinds may be used in a combined manner.

Besides the aforementioned ingredients, the paper sheet may contain other ingredient commonly used for the fuel cell separator. Such other ingredient is exemplified by internal mold releasing agents such as stearate-based wax, amide-based wax, montanate-based wax, carnauba wax and polyethylene wax; surfactants such as anionic, cationic and nonionic ones; strong acid; strong electrolyte; base; known flocculants suited to polyacrylamide-based, sodium polyacrylate-based and polymethacrylate-based surfactants; and thickeners such as carboxymethyl cellulose, starch, vinyl acetate, polylactic acid, polyglycolic acid and polyethylene oxide. Contents of these ingredients may freely be determined, so long as the effect of this invention will not be damaged.

The paper sheet may be manufactured by a paper making process using a composition containing the aforementioned individual ingredients. Method of paper making may be any of known methods without special limitation. For example, the paper sheet of this invention may be manufactured by dispersing a composition containing the aforementioned individual ingredients into a solvent unable to dissolve them, by allowing the obtained dispersion to deposit the ingredients on a substrate, and then by drying the obtained deposit. The sheet, manufactured by the paper making process, will have the fiber uniformly dispersed therein, and can contain as much fiber as the sheet will have a sufficient level of strength.

The paper sheet exhibits a sufficient level of strength even the grammage thereof is as small as about 150 to 300 g/m$^2$. The paper sheet preferably has a thickness of about 0.2 to 1.0 mm.

[Carbon Fiber Sheet]

The carbon fiber sheet is exemplified by nonwoven and woven fabrics of carbon fiber. The carbon fiber is exemplified by those derived from polyacrylonitrile-based resin, polyester-based resin, polyurethane-based resin, polyethylene-based resin, polypropylene-based resin, polyacrylic resin, polyether-based resin, polyvinylidene chloride-based resin, polyvinyl-based resin, polyimide-based resin, polyimide-based resin, and polyamide-imide-based resin; and pitch-based carbon fibers derived from pitch such as petroleum pitch. Only a single kind of them may be used independently, or two or more kinds may be used in a combined manner.

The nonwoven fabric of carbon fiber is exemplified by those obtained by subjecting a spinning solution containing any of the aforementioned starting material to a variety of spinning method such as electrospinning, spun-bonding, melt-blowing, and flash spinning, and by carbonizing the obtained nonwoven fabric. Meanwhile, the woven fabric of carbon fiber is exemplified by those obtained by carbonizing a woven fabric of fiber composed of any of the aforementioned resins enumerated above as the starting materials of the nonwoven fabric.

The carbon fiber in the carbon fiber sheet preferably has an average fiber length of 3 to 25 mm, and more preferably 4 to 20 mm. The average fiber diameter is preferably 3 to 50 μm, and is more preferably 3 to 15 μm. The carbon fiber preferably has a grammage of 100 g/m$^2$ to 200 g/m$^2$. The carbon fiber sheet preferably has a thickness of 200 to 2,000 μm.

[Carbon Fiber-Reinforced Carbon Composite Material]

The carbon fiber-reinforced carbon composite material contains a carbon fiber and a carbonaceous matrix. The material may also contain an electroconductive filler such as graphite described above. The carbon fiber is exemplified by those explained previously in the paragraphs regarding the carbon fiber sheet. The matrix is a carbonized product of thermosetting resin or thermoplastic resin. The thermosetting resin and the thermoplastic resin employable here may be any of known ones. The carbon fiber-reinforced carbon composite material preferably has a thickness of 150 to 600 μm.

[Resin Composition]

The resin composition to be impregnated into the porous sheet containing the electroconductive filler (also referred to as "resin composition for fuel cell separator", hereinafter) contains a thermoplastic resin and an electroconductive filler.

The thermoplastic resin is preferably any of resins having a melting point or a glass transition point of 100° C. or higher from the viewpoint of heat resistance, but not specifically limited thereto. Such thermoplastic resin is exemplified by those having a melting point of 100° C. or higher selected from polyethylene, polypropylene, polyphenylene sulfide, fluorine-containing resin, polybutylene terephthalate, liquid crystal polymer, polyether ether ketone, polycycloolefin, polyether sulfone, and derivatives of these resins; and those having a glass transition point of 100° C. or higher selected from polycarbonate, polystyrene, polyphenylene oxide, and derivatives of these resins. Although the upper limit of the melting point or glass transition point of the thermoplastic resin is not specifically limited, it is preferably 300° C. or lower, from the viewpoint of productivity of the fuel cell separator precursor and the fuel cell separator. The thermoplastic resin is preferably polypropylene, from the viewpoint of cost, heat resistance, and creep resistance.

In particular, in a case where the paper sheet is used as the porous sheet, the melting point or the glass transition point of the thermoplastic resin is preferably 10° C. or more lower than the melting point of the first organic fiber contained in the paper sheet, which is more preferably 20° C. or more lower, and even more preferably 30° C. or more lower. In a case where the paper sheet contains not only the first organic fiber but also the second organic fiber, the thermoplastic resin preferably has affinity to the second organic fiber.

The content of the thermoplastic resin in the resin composition is preferably 20 to 99.9% by weight, and more preferably 40 to 80% by weight.

The electroconductive filler is not specifically limited, and any known materials having been used for the fuel cell separator are employable. The electroconductive filler is exemplified by carbon material; metal powder; and inorganic or organic powder on which metal is deposited by evaporation or plating. Carbon material is preferable. The carbon material is exemplified by graphites such as natural graphite, synthetic graphite obtained by baking needle coke, synthetic graphite obtained by baking hump coke, and expandable graphite obtained by chemical treatment of natural graphite; crushed carbon electrode; coal pitch; petroleum pitch; coke; activated carbon; glassy carbon; acetylene black; and Ketjen black. Among them, natural or synthetic graphite is preferable as the electroconductive filler from the viewpoint of electroconductivity. Only a single kind of the electroconductive filler may be used independently, or two or more kinds may be used in a combined manner.

The electroconductive filler may have any shape selectable without special limitation from sphere, scale, lump, foil, plate, needle and irregular shape. From the viewpoint of gas barrier performance of the separator, a scaly shape is preferable. In particular, in this invention, the scaly graphite is preferably used as the electroconductive filler.

The electroconductive filler preferably has an average particle size of 5 to 200 μm, which is more preferably 5 to 50 μm. With the average particle size of the electroconductive filler controlled within the aforementioned ranges, a necessary level of electroconductivity is obtainable while retaining gas barrier performance.

The content of the electroconductive filler in the resin composition is preferably 0.1 to 80% by weight, and more preferably 20 to 60% by weight. With the content of the electroconductive filler controlled within the aforementioned ranges, the electroconductive filler will be well dispersible into the resin, and will be prevented from segregating when impregnated.

The resin composition for fuel cell separator may further contain a modifier. The modifier is exemplified by antioxidant, heat stabilizer, halogen scavenger, UV absorber, antibacterial agent inorganic filler, lubricant, plasticizer, flame retarder, surfactant, hydrophilizer, water repellant, and sliding agent. Contents of these ingredients may freely be determined, so long as the effect of this invention will not be damaged.

The resin composition for fuel cell separator preferably has a liquid form including slurry form, or has a film form. The resin composition for fuel cell separator, when given in a liquid form, may be for example a dispersion obtained by dissolving or suspending the aforementioned ingredients into a solvent. The solvent is suitably selectable according to purposes without special limitation, typically from aqueous solvent and organic solvent. The aqueous solvent is exemplified by water and alcohol. The organic solvent is exemplified by N-methyl-2-pyrrolidone (NMP), and toluene. The content of the solvent is preferably adjusted so that the resin composition will have a solid content of 10% by weight or larger, which is more preferably 30% by weight or larger, meanwhile a solid content is preferably 99% by weight or smaller, which is more preferably 89% by weight or smaller. The solid content means ingredients in the resin composition other than the solvent.

The resin composition for fuel cell separator, when given in a film form, may be for example a film obtained by heating and kneading the thermoplastic resin and the electroconductive filler at a temperature higher than the melting point of the thermoplastic resin, and then formed into a film (simply referred to as "resin film", hereinafter). Forming method employable in this case is exemplified by roll pressing, flat plate pressing, and belt pressing. The thickness of the film is suitably determined depending on the amounts of resin and electroconductive filler to be impregnated into the porous sheet.

The fuel cell separator precursor of the invention preferably has a thickness of about 150 to 600 μm.

[Method for Manufacturing Fuel Cell Separator Precursor]

The fuel cell separator precursor may be manufactured by impregnating the resin composition for fuel cell separator into the porous sheet. Method of impregnation into the resin composition for fuel cell separator, when given in a film form, is exemplified by a method by which the resin film is impregnated in a molten state under heating. For the resin composition given in a liquid form, exemplified is a method by which the porous sheet is immersed in such liquid to be impregnated.

Among these methods, the method by which the resin film in a molten state under heating is impregnated is preferable, from the viewpoints of uniformity of the amount of resin to be impregnated, and productivity. In a typical method of impregnation using the resin film, the resin film may be stacked on the porous sheet, the stack may be heated to a temperature equal to or higher than the melting point of the resin used for the resin film, and then allowed to stand still. The stack in this process is preferably heated up to a temperature approximately 5 to 50° C. higher than the melting point of the resin.

With the resin composition for fuel cell separator impregnated therein, the porous sheet will have an electroconductive filler layer formed on the surface thereof (that is, the electroconductive filler is localized on the surface of the sheet), so that the fuel cell separator obtainable from the precursor of this invention will have resistivity which is suppressed from degrading, and will have improved surface conductivity.

[Fuel Cell Separator]

The fuel cell separator of the invention may be manufactured by heating and molding the fuel cell separator precursor. The molding method is preferably compression molding, but is not specifically limited thereto. Temperature in the process of compression molding (die temperature) is preferably 10° C. or more higher than the melting point of the resin having been impregnated, which is more preferably 20° C. or more higher. In a case where the paper sheet is used as the porous sheet, the die temperature is preferably 10° C. or more lower than the organic fiber (first organic fiber), which is more preferably 20° C. or more lower. The molding pressure is preferably 1 to 100 MPa, and is more preferably 1 to 60 MPa.

According to this method, it now becomes possible to manufacture the fuel cell separator which is thinned to about 0.1 to 0.6 mm, and improved in electroconductivity.

EXAMPLES

This invention is further detailed below referring to Manufacturing Examples, Examples and Comparative Examples. This invention is however not limited to Examples below. Materials used in Examples below are as follows.

Natural graphite: average particle size=25 μm
Synthetic graphite: average particle size=50 μm PAN-based carbon fiber: average fiber length=3.0 mm, average fiber diameter=7 μm
Cellulose fiber: average fiber length=1.2 mm, average fiber diameter=25 μm, melting point=260° C.
Polypropylene (PP) fiber: average fiber length=0.9 mm, average fiber diameter=30 μm, melting point=160° C.

[1] Manufacture of Porous Sheet

Manufacturing Example 1

Eighty-four parts by weight of the synthetic graphite, 6 parts by weight of the PAN-based carbon fiber, 5 parts by weight of the cellulose fiber, and 5 parts by weight of the PP fiber were placed in water, and the mixture was stirred to obtain a fiber shiny. The slurry was subjected to paper making, to obtain porous sheet A. The porous sheet A was found to have a grammage of 229 g/m².

Manufacturing Example 2

Eighty-four parts by weight of the synthetic graphite, 6 parts by weight of the PAN-based carbon fiber, and 10 parts by weight of the cellulose fiber were placed in water, and the mixture was stirred to obtain a fiber slurry. The slurry was subjected to paper making, to obtain porous sheet B. The porous sheet B was found to have a grammage of 212 g/m².

[2] Manufacture of Resin Film for Impregnation

Forty parts by weight of the natural, graphite and 60 parts by weight of PP (melting point=160° C.) were fed to a unidirectional twin screw extruder, and kneaded at 180° C. and a rotation speed of 200 rpm, to obtain a resin composition. The obtained resin composition was formed using a 30-mm-diameter single screw extruder at 200° C., to obtain a film of 270 mm wide and 220 μm thick. The obtained sheet was further rolled using a roll press set at a roll gap of 30 μm at 200° C., to obtain a resin film for impregnation with an average thickness of 35 μm.

[3] Manufacture of Fuel Cell Separator Precursor and Fuel Cell Separator

Example 1

The resin films for impregnation were placed on the upper and lower faces of the porous sheet A, and the stack was allowed to stand at 185° C. for 5 minutes, to obtain fuel cell separator precursor A. A metallograph of the fuel cell separator precursor A is shown in FIG. 1. The fuel cell separator precursor A was confirmed to have the organic fiber not so much appeared on the surface thereof, and to have an electroconductive filler layer formed thereon.

The fuel cell separator precursor A was then subjected to compression molding with a molding pressure kept at 47 MPa, under natural cooling from a die temperature of 185° C. down to 100° C., to thereby obtain fuel cell separator A (0.17 mm thick).

Example 2

The resin films for impregnation were placed on the upper and lower faces of the porous sheet B, and the stack was allowed to stand at 185° C. for 5 minutes, to obtain fuel cell separator precursor B. The fuel cell separator precursor B was then subjected to compression molding with a molding pressure kept at 47 MPa, under natural cooling from a die temperature of 185° C. down to 100° C., to thereby obtain fuel cell separator B (0.16 mm thick).

Comparative Example 1

Figure 2:
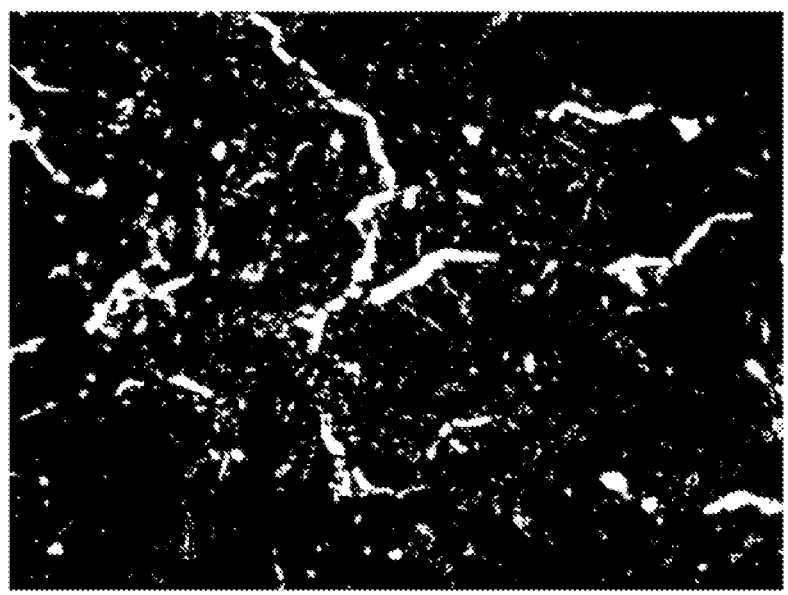
FIG. 2 is a metallograph of fuel cell separator precursor C obtained in Comparative Example 1.

PP films (XF from Okamoto Industries, Inc., 25 μm thick) were placed on the upper, and lower faces of the porous sheet A, and the stack was allowed to stand at i85° C. for 5 minutes, to obtain fuel cell separator precursor C. A metallograph of the fuel cell separator precursor C is shown in FIG. 2. The organic fiber was observed on the surface of the fuel cell separator precursor C.

The fuel cell separator precursor C was then subjected to compression molding with a molding pressure kept at 47 MPa, under natural cooling from a die temperature of 185° C. down to 100° C., to thereby obtain fuel cell separator C (0.15 mm thick).

Comparative Example 2

A compound composed of PP and graphite was spread over the dies, and was then subjected to compression molding with a molding, pressure kept at 47 MPa, under natural cooling from a die temperature of 185° C. down to 100° C., to thereby obtain fuel cell separator D (0.20 mm thick).

[4] Evaluation of Porous Sheet and Fuel Cell Separator Precursor

—Evaluation of Tensile Strength—

Tensile strength of the porous sheets and the fuel cell separator precursors was determined according to JIS K 7127 (Plastics—Determination of tensile properties—). Results are summarized in Table 1. Note that the strength necessary for enduring winding and unwinding is 8 N/40 mm or larger.

[5] Evaluation of Fuel Cell Separator—Evaluation of Electroconductivity—

Specific resistance of the fuel cell separators A to D were measured according to JIS H 0602 (Testing method of resistivity for silicon crystals and silicon wafers with four-point probe). Standard deviation was also calculated from the results measured at 18 points, to evaluate dispersion. Results are summarized in Table 1.

TABLE 1

|  | Tensile strength of porous sheet (N/40 mm) | Tensile strength of separator precursor (N/40 mm) | Specific resistance (mΩ · cm) | Standard deviation of specific resistance measured at 18 points |
|---|---|---|---|---|
| Example 1 | 12 | 18 | 17 | 2.3 |
| Example 2 | 14 | 20 | 16 | 2.1 |
| Comparative Example 1 | 12 | 17 | 20 | 3.3 |
| Comparative Example 2 | — | — | 14 | 4.0 |

Results summarized in Table 1 teach that the fuel cell separator precursors of this invention have strength enough to endure conveyance in a sheet form, and that the molded separators have reduced dispersion of electroconductivity. When compared with the prior method (Comparative Example 2) that employed the same materials, this invention was to found not only to enable winding into rolls, but also to suppress dispersion of electroconductivity.

The invention claimed is:
1. A fuel cell separator precursor comprising:
a porous sheet containing a first electroconductive filler, and a resin composition containing a thermoplastic resin and a second electroconductive filler, the resin composition being impregnated in the porous sheet, wherein the second electroconductive filler is localized on the surface of the porous sheet.

2. The fuel cell separator precursor according to claim 1, wherein the thermoplastic resin has a melting point or a glass transition point of 100° C. or higher.

3. The fuel cell separator precursor according to claim 1, wherein the second electroconductive filler contained in the resin composition includes a carbon material.

4. The fuel cell separator precursor according to claim 1, wherein the porous sheet containing the first electroconductive filler comprises:

a paper sheet containing the first electroconductive filler and an organic fiber, a carbon fiber sheet, or a carbon fiber-reinforced carbon composite material.

5. A fuel cell separator obtained from the fuel cell separator precursor according to claim 1.

6. A method for manufacturing a fuel cell separator precursor, the method comprising impregnating a resin composition containing a thermoplastic resin and a second electroconductive filler, into a porous sheet containing a first electroconductive filler.

7. The method for manufacturing a fuel cell separator precursor according to claim 6, wherein the resin composition has a film form.

8. The method for manufacturing a fuel cell separator precursor according to claim 6, wherein the resin composition has a liquid form.

9. A method for manufacturing a fuel cell separator, the method comprising heating and molding the fuel cell separator precursor according to claim 1.

10. A resin composition for fuel cell separator comprising a thermoplastic resin and an electroconductive filler.

11. The fuel cell separator precursor according to claim 1 wherein the first and second electroconductive fillers are carbon material, metal powder, and inorganic or organic powder on which metal is deposited by evaporation or plating, wherein the carbon material is selected from the group consisting of natural graphite, synthetic graphite obtained by baking needle coke, synthetic graphite obtained by baking lump coke, crushed carbon electrode, coal pitch, petroleum pitch, coke, activated carbon, glassy carbon, acetylene black, and Ketjen black.

12. The fuel cell separator precursor according to claim 1, wherein the second electroconductive filler has an average particle size of 5 to 200 µm.

13. The fuel cell separator precursor according to claim 1, wherein the content of the thermoplastic resin in the resin composition is 20 to 99.9% by weight.

14. The fuel cell separator precursor according to claim 4, wherein the porous sheet containing the first electroconductive filler is a paper sheet containing the first electroconductive filler and an organic fiber.

15. The fuel cell separator precursor according to claim 13, wherein the organic fiber has an average fiber length of 0.1 to 10 mm, and an average fiber diameter of 0.1 to 100 µm.

* * * * *